United States Patent [19]

Teramachi

[11] Patent Number: 5,044,780
[45] Date of Patent: Sep. 3, 1991

[54] LINEAR SLIDING BEARING AND LINEAR SLIDING TABLE

[75] Inventor: Hiroshi Teramachi, Tokyo, Japan

[73] Assignee: THK Co, Ltd., Tokyo, Japan

[21] Appl. No.: 469,464

[22] PCT Filed: Aug. 15, 1989

[86] PCT No.: PCT/JP89/00828
§ 371 Date: Apr. 3, 1990
§ 102(e) Date: Apr. 3, 1990

[87] PCT Pub. No.: WO90/02270
PCT Pub. Date: Mar. 8, 1990

[30] Foreign Application Priority Data

Aug. 16, 1988 [JP] Japan .................. 63-202666

[51] Int. Cl.⁵ ............................................ F16C 29/06
[52] U.S. Cl. ..................................................... 384/44
[58] Field of Search ............................. 384/44, 45, 43; 464/168

[56] References Cited

U.S. PATENT DOCUMENTS

| | | | |
|---|---|---|---|
| 4,505,525 | 3/1985 | Wolzenburg | 384/565 |
| 4,659,238 | 4/1987 | Teramachi | 384/44 |
| 4,715,729 | 12/1987 | Tanaka . | |
| 4,730,945 | 3/1988 | Luther et al. | 384/44 |
| 4,953,988 | 9/1990 | Tsukada | 384/45 |

FOREIGN PATENT DOCUMENTS 3742965  7/1988  Fed. Rep. of Germany .
2546587  11/1984  France .

Primary Examiner—Lenard A. Footland
Attorney, Agent, or Firm—Armstrong, Nikaido, Marmelstein, Kubovcik & Murray

[57] ABSTRACT

Herein disclosed are a linear sliding bearing and a linear sliding table, in which rollers have their sides pressed to suppress their rolling motions by the frictional force so that the sliding resistance of a sliding bed sliding on a track base may be increased. Since a predetermined rigidity can be attained even in the axial direction of the track base by increasing or decreasing the sliding resistance arbitrarily, a workpiece of high machining precision can be achieved when the bearing or table is used in a machine apparatus such as a machine tool.

6 Claims, 12 Drawing Sheets

LINEAR SLIDING BEARING AND LINEAR SLIDING TABLE

TECHNICAL FIELD

The present invention relates to a linear sliding bearing for linearly guiding a moving member to be slid in a machine tool such as a NC machine or a slide of an industrial robot.

BACKGROUND ART

In case a workpiece is to be machined by a machine tool, for example, loads accompanying the machining in various directions are generally exerted between the machine tool and the workpiece, although depending upon the kinds of machining such as cutting or polishing, the material of the workpiece or the machining conditions. The loads act as reaction forces upon the machine tool and the workpiece. If the machine tool and the workpiece are completely fixed at the instant of machining against the loads, the machining can be ideally accomplished in a drastically improved precision.

In the case of machining of the workpiece using such machine tool, one of the machine tool or the workpiece is fixed whereas the other is moved by means of a mechanism such as a linear sliding bearing.

The linear sliding bearing known to used for this purpose is constructed to include: a track base having axial races; a sliding bed having endless tracks which are formed of load regions having load races facing the races of the track base and no-load regions providing the communicating connections between the two ends of the load regions; and rollers circulating in the endless tracks for bearing the loads between the races of the track base and the load races of the sliding bed. Thus, the linear sliding bearing can bear the loads in the four directions, i.e., radial, inversely radial and rightward and leftward directions. In the linear sliding bearing of this kind, moreover, the rigidities in the four directions are enhanced by applying a prepressure to the rollers to bear the four-directional loads to be generated between the machine tool and the workpiece during the machining, so that the accompanying chatter marks and vibrations may be suppressed as much as possible to improve the machining precision. In connection with the axial direction of the track base, on the other hand, frictions in the movements are suppressed with a view to lightening the loads upon the feeding drive system such as a feeder of screw and nut type or a motor mechanism. The rigidity necessary for the machining in the axial direction of the track base relies exclusively upon that of the feeding drive system.

Incidentally, the rigidity of the feeding drive system is determined, if the system is the feeder of screw and nut type, by the rigidity of the feed screw or nut itself, the rigidity of the support of the feed screw or nut, and the rigidity of the motor for applying a rotating force to the feed screw. In order to increase the rigidity of the feeding drive system, it is necessary to enlarge the size of the feed screw or nut or to raise the output of the motor. Thus, the increase in the rigidity of the feeding drive system is intrinsically limited by the problems which are caused by increasing the size of the apparatus or by raising the cost for the feeding drive system.

As various products are required to be the more precise in the industry of recent years, a machine apparatus such as the machine tool for machining the products is required to have its machining precision improved the better. Thus, the linear sliding bearing taking a leading role for the machining precision of the various machine apparatus is requested to improve the machining precision.

It is, therefore, an object of the present invention to provide a linear sliding bearing which can have not only the rigidities of four directions, i.e., the radial, inversely radial, rightward and leftward directions but also a predetermined rigidity in the axial direction of the track base.

Another object of the present invention is to provide a linear sliding bearing which can apply the rigidity in the axial direction of the track base, if necessary, and adjust the level of the rigidity.

Still another object of the present invention is to provide a linear sliding table which can mount a machine apparatus such as a machine tool for machining of high precision.

DISCLOSURE OF THE INVENTION

According to the present invention, there is provided a linear sliding bearing comprising: a track base having axial roller races and fixed to a machine apparatus or the like; a sliding bed formed with endless tracks, which have load regions having load races facing said roller races and no-load regions for effecting the communicating connections between the two ends of said load regions, and made movable along said track base; and a multiplicity of rollers circulating in said endless tracks for bearing the load between the load races of said sliding bed and the races of said track base, wherein the improvement resides in that said sliding bed includes: side walls extending along one-end sides of said load races for regulating the axial movements of load rollers rolling on said load races; and pressure means for pressing the one-end sides of said load rollers in the axial direction and the other sides onto said side walls.

According to the present invention, there is provided a linear sliding table placed on the upper surface of a sliding bed of a bearing which comprises: a track base having axial roller races and fixed to a machine apparatus or the like; a sliding bed formed with endless tracks, which have load regions having load races facing said roller races and no-load regions for effecting the communicating connections between the two ends of said load regions, and made movable along said track base; and a multiplicity of rollers circulating in said endless tracks for bearing the load between the load races of said sliding bed and the races of said track base, said sliding bed including: side walls extending along one-end sides of said load races for regulating the axial movements of load rollers rolling on said load races; and pressure means for pressing the one-end sides of said load rollers in the axial direction and the other sides onto said side walls.

In these linear sliding bearing and table, moreover, the pressure means presses the one-end sides of the load rollers in the axial direction and the other sides to the side walls formed on the sliding bed or beds. As a result, the rollers have their two-end sides pressed onto the pressure means and the sliding bed or beds so that their rolling motions are suppressed by the frictional forces to increase the sliding resistances of the sliding bed or beds rolling on the track base or bases.

In this technical means, the sliding bed can be selected from a suitable structure if it has the endless tracks for circulating the rollers and can slide freely on the track base and if it has the side walls for regulating the axial movements of the load rollers. The structure conceivable can be exemplified in various manners: by one including a horizontal portion and a pair of skirts depending from the two sides of the horizontal portion to form a recess in its lower side and formed with a pair of righthand and lefthand upper load races and lower load races extending axially on their inner sides; by a generally inverted L-shape which has a horizontal portion and skirts depending from one end of the horizontal portion and which has load regions extending along the lower side of the horizontal portion and the inner sides of the skirts and depends from the tack base; or by a generally rectangle having load regions extending axially along its sides and arranged along the sides of the track base. Incidentally, the aforementioned side walls to be given to the sliding bed may be formed directly on the sliding bed or indirectly on another member to be attached to the sliding bed.

On the other hand, the aforementioned endless tracks may be suitably exemplified by changing the designs of their numbers or the angle of inclination of the load races in accordance with the usage of the bearings or the structure of the sliding bed. Moreover, the no-load regions may be suitably exemplified by forming the no-load rolling holes in the sliding bed or the no-load rolling tracks by roller retainers to be attached from the outside to the sliding bed.

On the other hand, the rollers to be circulated in the aforementioned endless tracks may be suitably selected from cylindrical rollers or barrel-shaped rollers. In the former case using the cylindrical rollers, the load races of the sliding bed and the races of the track base are planar along the circumferences of the rollers. In the latter case using the barrel-shaped rollers, the load races and the races are curved.

On the other hand, the pressure means may be suitably exemplified by changing the designs of the structure or shape if it can press the one-end sides of the load rollers in their axial direction and the other sides to the aforementioned side walls. In order to simplify the apparatus structure, it is preferable to form the retaining surfaces for preventing the load rollers from coming out under non-pressure conditions, at the leading ends of the pressure surfaces for pressing the sides of the load rollers. In order to make the linear sliding bearing compact, moreover, the pressure means may preferably be so attached to the sliding bed as is positioned in the gap between the track base and the sliding bed and as will press the load rollers of two rows simultaneously. In order to prevent the pressed load rollers from being abruptly locked, still moreover, the pressure means may preferably press the load rollers of that of several rows, which must bear the highest load. Incidentally, the method for the pressure means to apply the pressure may be exemplified by changing the designs, e.g., by actuating the pressure means continuously by means of the fastening forces of bolts or the elastic forces of springs, or by actuating the pressure means instantly in the required place of the track base by means of a fluid such as oil.

Furthermore, the bearings of the aforementioned linear sliding table may be suitably exemplified by deciding the number of bearings to be disposed below the table in dependence upon the width of the table or the load to be exerted upon the table.

DESIGNATIONS OF THE REFERENCE CHARACTERS

1—Sliding Bed; 1a—Horizontal Portion; 1b—Housing; 2—Track Base; 3—Cover; 4—Rollers; 4a—Load Rollers; 5—Braking Plate; 6—Roller Guides; 7—O-Ring; 8—Dish-Spring Washers; 9—Screws; 10—Pressure Bolts; 11—Relief Roller Track; 12—Side Walls; 13—Mounting Holes; 14—Oil Hole; 21—Lower Rolling Surfaces; 22—Upper Rolling Surfaces; 51—Oil Pocket; 52—Pressure Surfaces; 53—Retaining Surfaces; and T—Table.

BEST MODE FOR CARRYING OUT THE INVENTION

A linear sliding bearing and a linear sliding table will be described in detail in the following with reference to the accompanying drawings.

First Embodiment

Figure 1:
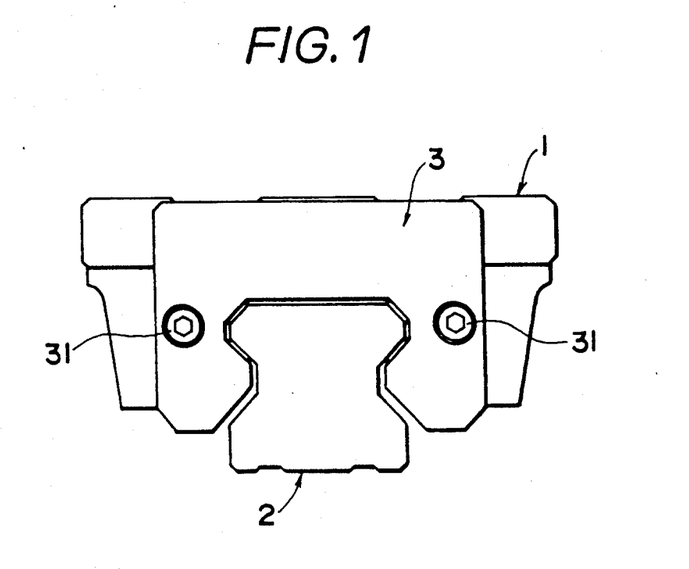
FIG. 1 is a front elevation showing a first embodiment of a linear sliding bearing according to the present invention.
Figure 2:
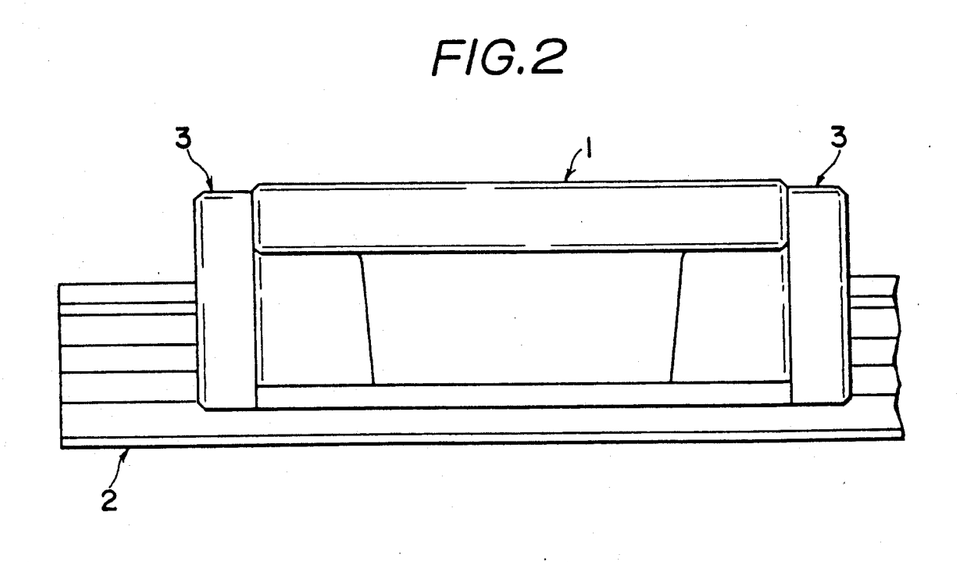
FIGS. 2 and 3 are a side elevation and a top plan view of the linear sliding bearing of the first embodiment.
Figure 3:
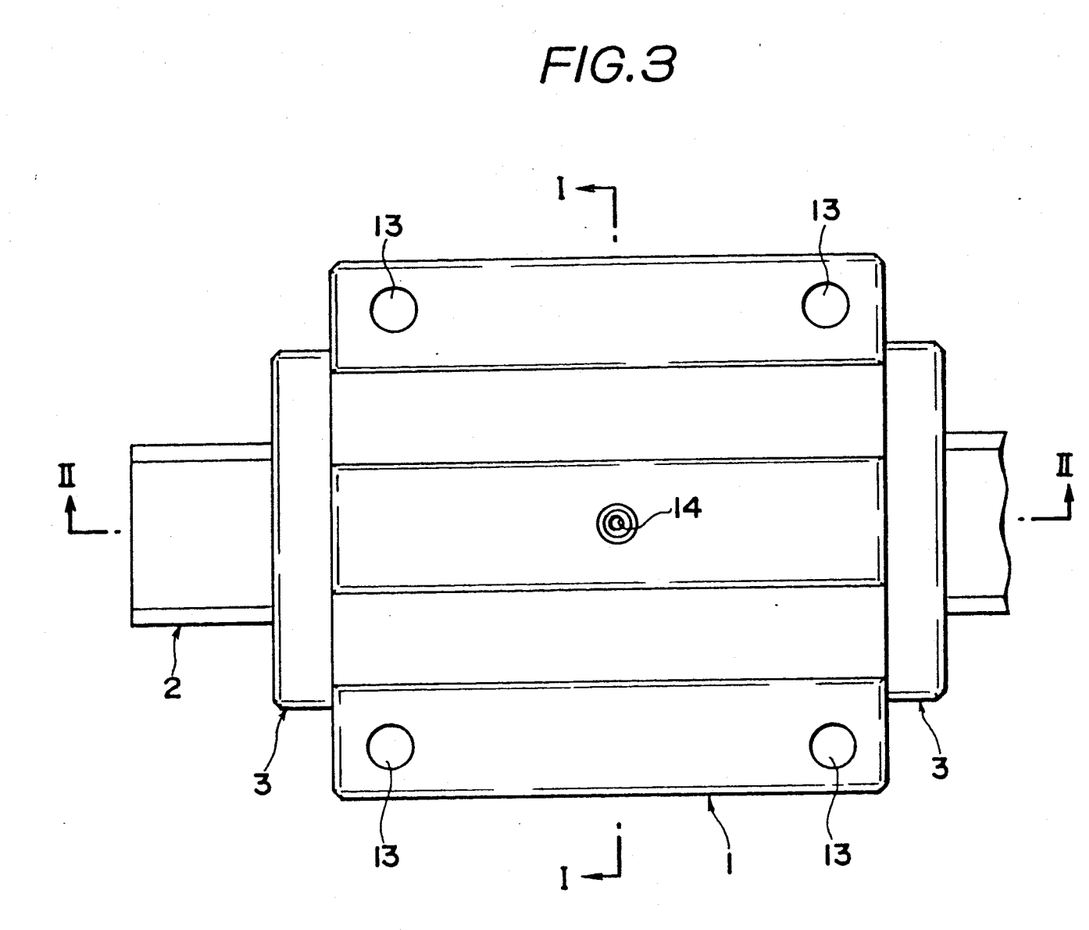
Figure 4:
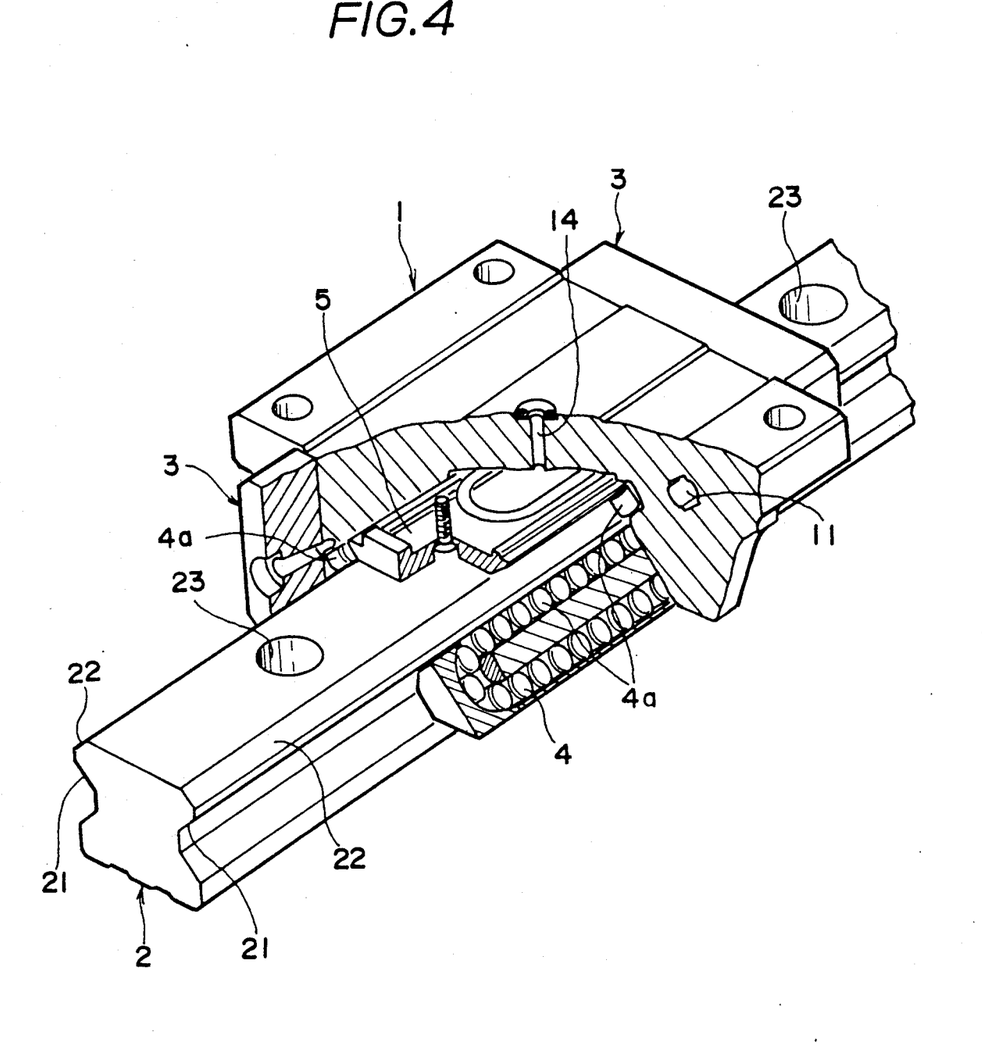
FIG. 4 is a cut-away perspective view showing the linear sliding bearing according to the first embodiment.
Figure 5:
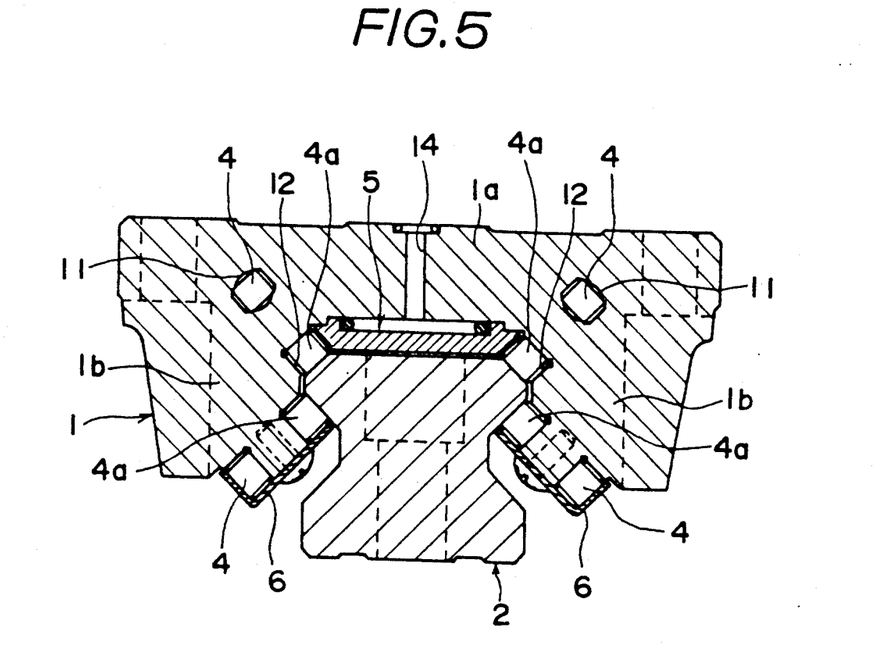
FIG. 5 is a section taken along line I—I of FIG. 3.

The linear sliding bearing according to the present embodiment is constructed, as shown in FIGS. 4 and 5, to include: a sliding bed 1 formed generally into a C-shaped section having a horizontal portion 1a and righthand and lefthand skirts 1b depending from the two ends of the horizontal portion 1a to leave a groove in its lower side; a pair of roller guides 6 mounted on the lower ends of the righthand and lefthand skirts 1b of the sliding bed 1; a track base 2 fixed to a machine apparatus by fixing means such as fixing bolts; a number of rollers 4 circulating in an endless roller race formed in the sliding bed 1 for bearing a load between the sliding bed 1 and the track base 2; and a braking plate 5 positioned between the lower side of the horizontal portion 1a and the upper surface of the track base 2 and made suitably movable up and down in accordance with the pressure of a fluid introduced from the sliding bed 1 for pushing the sides of load rollers 4a rolling on a load race formed on the sliding bed 1.

The sliding bed 1 constitutes load regions of an upper endless roller track and a lower endless roller track in the axial direction, respectively, on the two ends of the lower side of the horizontal portion 1a and the lower ends of the inner surfaces of the righthand and lefthand skirts 1b. The load regions are formed with load races on which the rollers 4 are caused to roll. Above the righthand and lefthand skirts 1b, moreover, there are formed relief roller tracks 11 which correspond to the load regions of the upper endless roller tracks. On the other hand, the righthand and lefthand skirts 1b are formed at their lower ends with no-load regions which correspond to the load regions of the lower endless roller tracks. At the lower ends of the load races of the righthand and lefthand upper endless roller tracks, moreover, there are formed side walls 12 for regulating the axial movements of the load rollers 4a which are caused to roll on those load races. Incidentally, the aforementioned load regions are inclined at such predetermined angles that their four races are parallel with the upper races and the lower races of the track base 2 when the bearing of the present invention is assembled. The sliding bed 1 is formed at its two widthwise end portions with mounting holes 13 into which mounting bolts are inserted from the lower to upper surfaces. On the other hand, the lower side of the horizontal portion 1a of the sliding bed 1 provides a portion for mounting the braking plate 5 acting as pressure means for pushing the sides of the load rollers 4a and is formed at its center with an oil hole 14 which extends vertically therethrough to admit the oil for applying the pressure to the braking plate 5. The lower side of the horizontal portion 1a is further formed with mounting holes 15 which are to be engaged with screws extending through the braking plate 5.

To each of the longitudinal end portions of the sliding bed 1 described above, there is fixed by fixing bolts 31 a cover 3 which is made of a synthetic resin. These covers 3 are formed with grooves for establishing the communicating connections between the load regions formed in the sliding bed 1 and the corresponding relief roller tracks 11 or the no-load regions.

On the other hands, the aforementioned roller guides 6 are formed to have a generally L-shaped section by pressing a metallic plate or injection-molding a hard synthetic resin, as shown in FIG. 5, and are secured to the lower ends of the righthand and lefthand skirts 1b of the sliding bed 1 by means of screws. Thus, the load and no-load regions formed at the lower ends of the righthand and lefthand skirts 1b form the endless roller tracks to guide the individual rollers, together with the roller turning portions which are formed in the covers 3.

On the other hand, the aforementioned track base 2 is formed into such a section that a rectangle has its two sides notched to form a trapezoid whose two side shoulders further notched to form downward slopes and upward slopes. Of these slopes, the lower ones provide lower races 21 which correspond to the lower endless roller tracks formed a the lower ends of the skirts 1b of the sliding bed 1, whereas the upper ones provide upper races 22 which correspond to the upper endless roller tracks formed at the two ends of the lower side of the horizontal portion 1a of the sliding bed 1. Moreover, the track base 2 is formed at its central portion with fixing bolt mounting holes 23 for receiving fixing bolts which are fastened to a stationary portion. The bolt mounting holes 23 are vertically extended in the upper surface of the track base 2 and are bored at a suitable spacing in the longitudinal direction of the track base 2.

Figure 6:
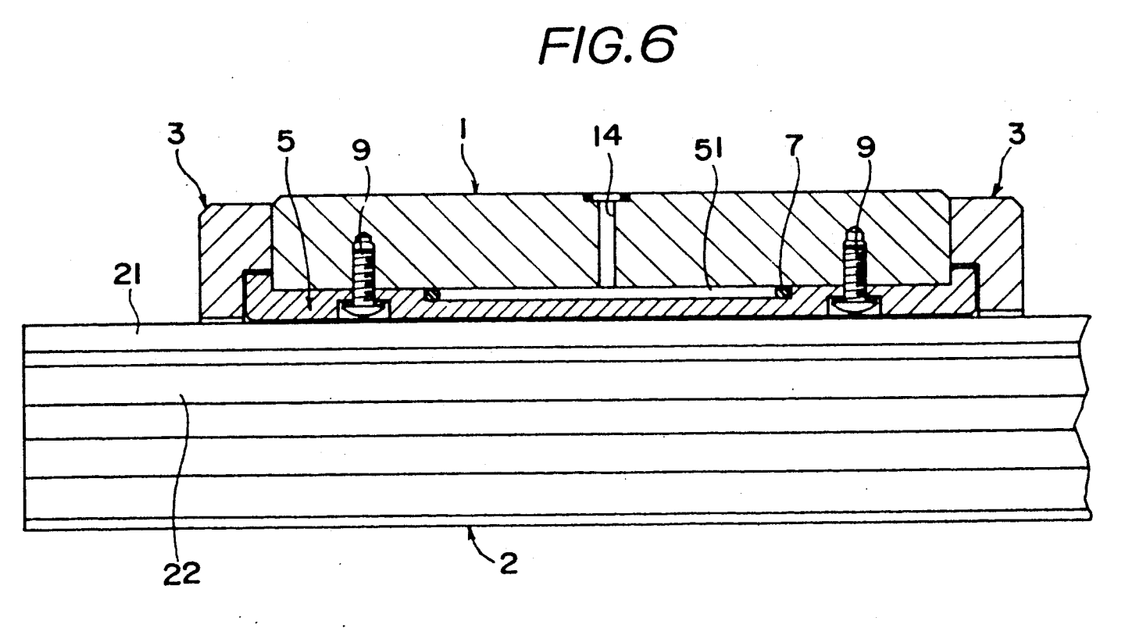
FIG. 6 is a section taken along line II—II of FIG. 3.
Figure 7:
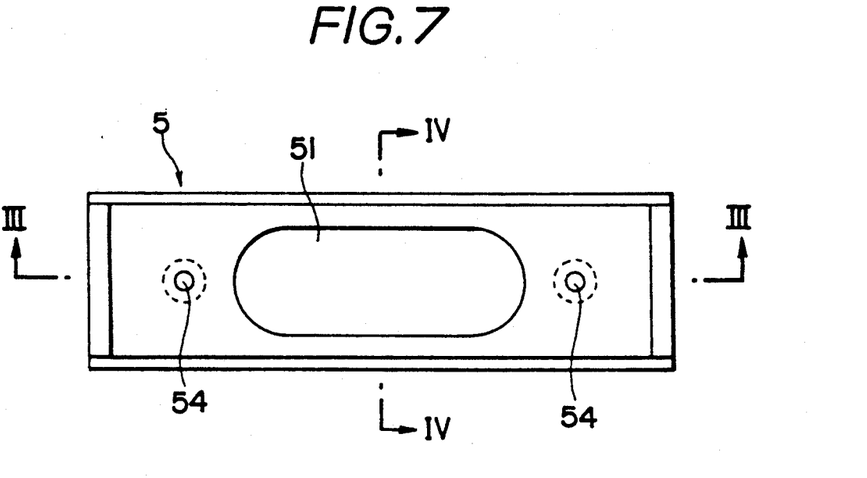
FIG. 7 is a top plan view showing a braking plate exemplifying the pressure means of the linear sliding bearing according to the first embodiment.
Figure 8:
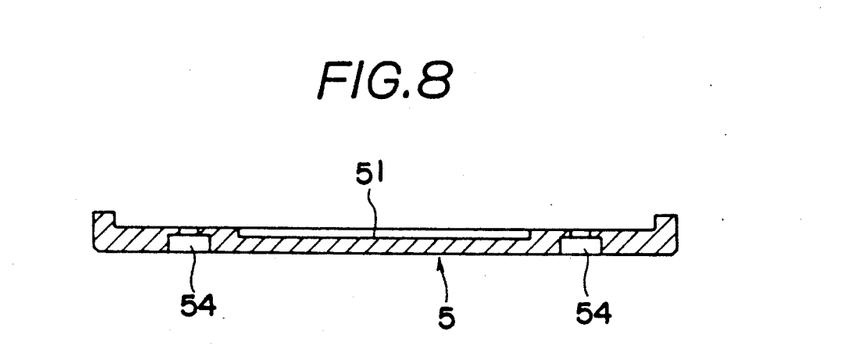
FIG. 8 is a section taken along line III—III of FIG. 7.
Figure 9:
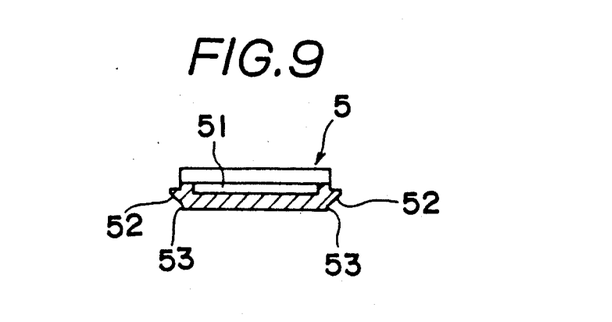
FIG. 9 is a section taken along line IV—IV of FIG. 7.

As shown in FIG. 5 or 6, the aforementioned braking plate 5 is a generally plane plate having a rectangular shape, which is positioned, when assembled, in the gap between the lower side of the horizontal portion 1a of the sliding bed 1 and the upper surface of the track base 2. The braking plate 5 is made of a softer material such as brass than that of the rollers and is given functions to push, if necessary, the sides of the load rollers 4a rolling on the upper races of the track base 2 and to align and retain the load rollers 4a. As better seen from FIGS. 7, 8 and 9, the braking plate 5 its upper surface recessed to form an oil pocket 51 which is to be filled up with the oil flowing into and out of the oil hole 14 formed in the center of the horizontal portion 1a of the sliding bed 1. The braking plate 5 is formed on its two widthwise end portions with pressure surfaces 52 which are sloped to face downward the sides of the load rollers 4a, when the bearing is assembled, thereby to suitably press the sides of the load rollers 4a rolling on the upper races of the track base 2. Those pressure surfaces 52 are longitudinally formed at their lower ends with retaining surfaces 53 for preventing the load rollers 4a rolling on the upper roller tracks of the track base 2 from coming out so that they may be associated with the side walls 12 formed in the sliding bed 1, to prevent the load rollers 4a from coming out. Moreover, the braking plate 5 is formed at its widthwise center with through holes 54 which are vertically extended from the bottom to the top for receiving screws to be fastened to the lower side of the horizontal portion 1a of the sliding bed 1. Here, the lower side and pressure surfaces 52 of the braking plate 5 are so finished that the gap between the lower side of the braking plate 5 and the upper surface of the track base 2 may be larger, when the bearing is assembled, than that between the pressure surfaces 52 and the sides of the load rollers 4a belonging to the upper endless roller tracks.

Figure 10:
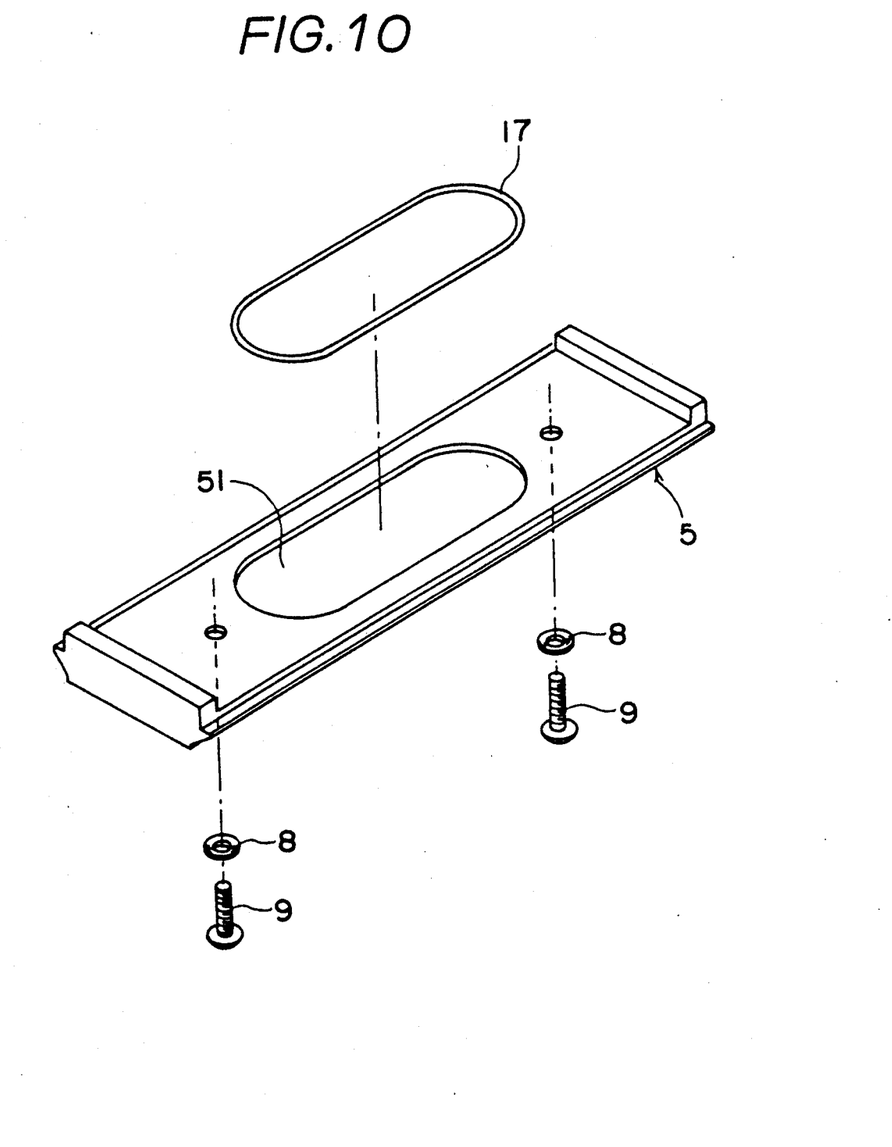
FIG. 10 is an exploded perspective view showing the assembly of the braking plate of the linear sliding bearing according to the first embodiment.

The braking plate 5 thus constructed is mounted in the sliding bed 1, as better seen from FIG. 10, by fitting an O-ring 7 in the inner periphery of the aforementioned oil pocket 51 for preventing the oil leakage, by inserting screws 9 together with dishspring washers 8 into the lower sides of the aforementioned through holes 54 and by fastening the screws 9 in the mounting holes formed in the lower side of the horizontal portion 1a of the sliding bed 1. At this time, the fastening forces of the screws 9 are decided: such that the dish-spring washers 8 sandwiched between the heads of the screws 9 and the lower side of the braking plate 5 are freely subjected to elastic deformations by the pressures exerted upon the braking plate 5 whereas the aforementioned O-ring 7 is always retained in close contact with the lower side of the horizontal portion 1a; and such that the braking plate 5 is pushed up to the lower side of the horizontal portion 1a of the sliding bed 1 by the elastic forces of the dish-spring washers 8 when no pressure is applied to the braking plate 5.

The linear sliding bearing thus constructed according to the present embodiment is used by fixing the track base 2 to the machine apparatus by means of the fixing bolts, by mounting a table carrying a variety of machine tools on the sliding bed 1 sliding along the track base 2 by means of the mounting bolts, by connecting a hydraulic apparatus (although not shown) to be driven in response to an instruction signal outputted from a control unit (although not shown) to the oil hole 14 of the sliding bed 1, and by applying an arbitrary pressure to the oil which fills up the oil pocket 51 of the braking plate 5 in a necessary place over the track base 2.

Figure 11:
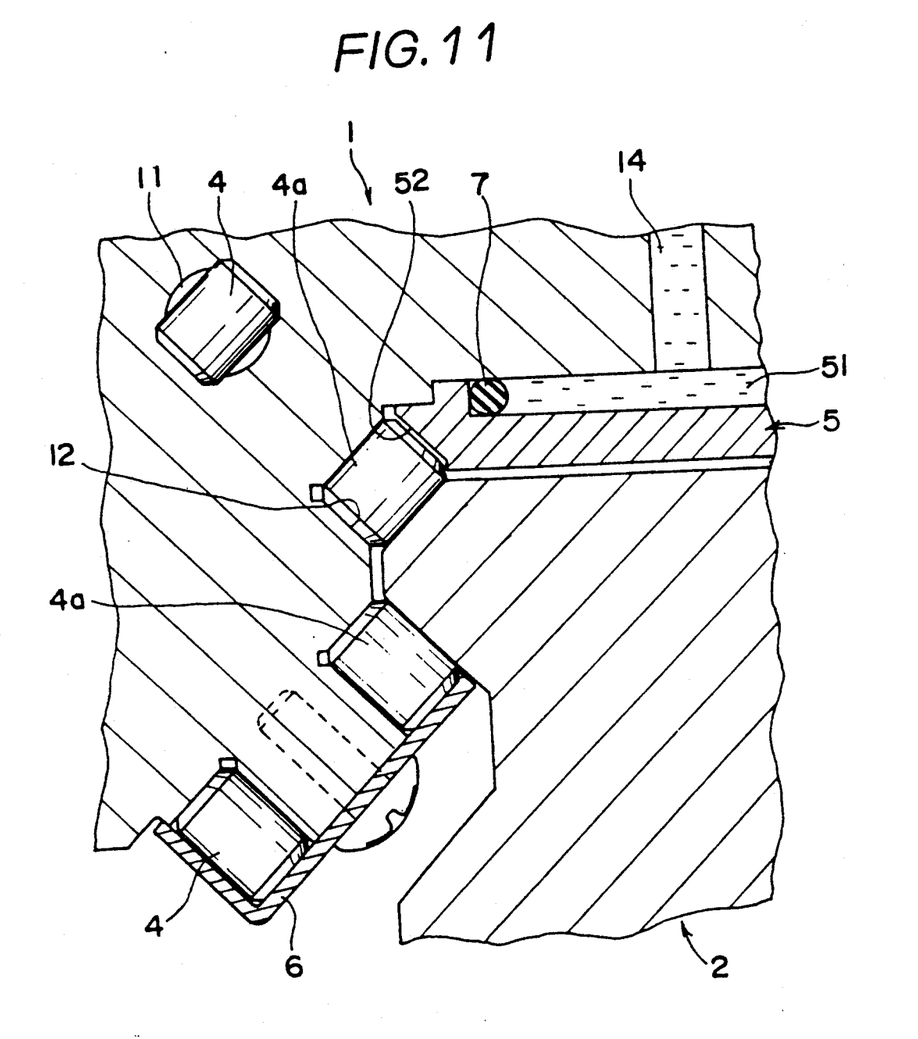
FIG. 11 is a section showing an essential portion in the state, in which no oil pressure is applied to the braking plate while the linear sliding bearing according to the first embodiment is used.
Figure 12:
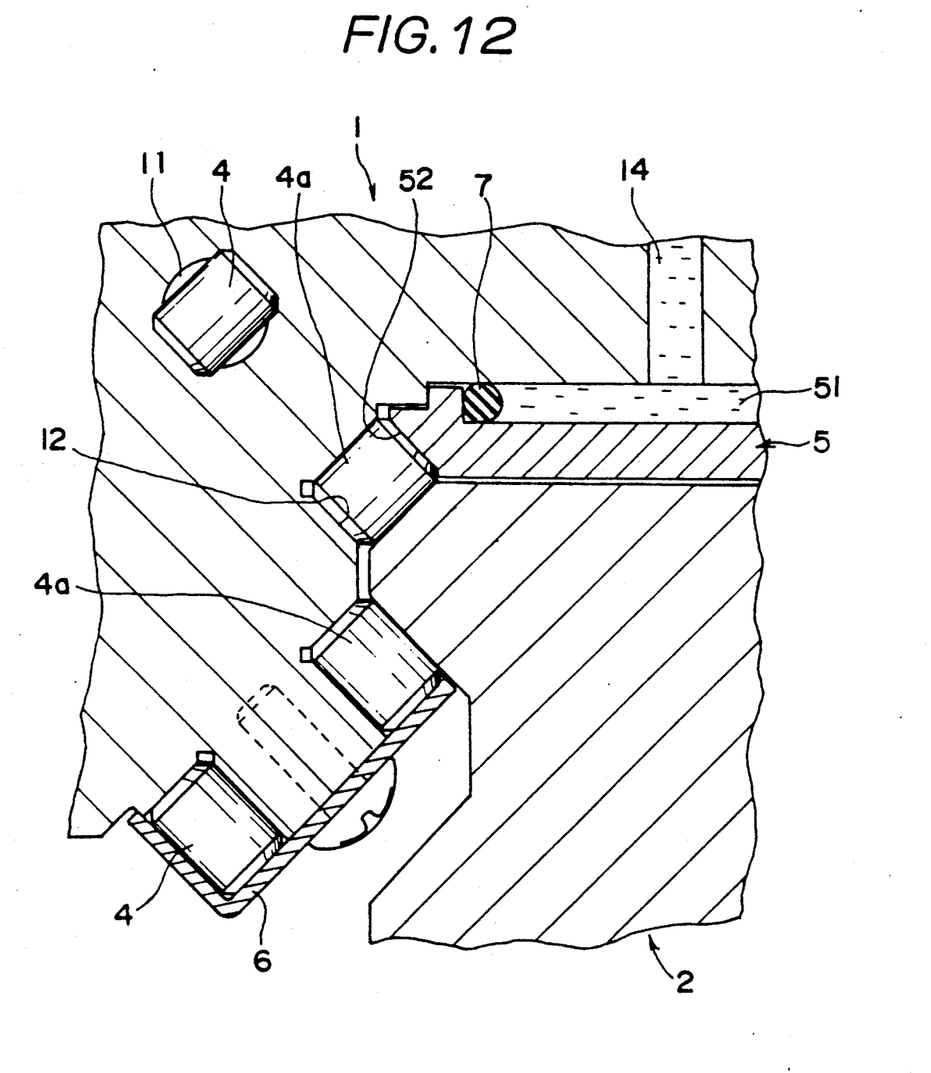
FIG. 12 is a section showing an essential portion in the state, in which an oil pressure is applied to the braking plate while the linear sliding bearing according to the first embodiment is used.

In case, at this time, no oil pressure is applied to the oil pocket 51, the braking plate 5 is raised to the lower side of the horizontal portion 1a of the sliding bed 1 by the elastic forces of the dish-spring washers 8 to keep its pressure surfaces 52 away from contact with the sides of the load rollers 4a rolling on the upper races of the track base 2, so that the load rollers 4a can freely roll on the races of the track base 2 to slide the sliding bed 1 on the track base 2 with a slight sliding resistance (as seen from FIG. 11). In case, on the contrary, the oil pressure P is applied to the oil pocket 51, it pushes the braking plate 5 downward so that the pressure surfaces 52 of the braking plate 5 push the one-end sides of the load rollers 4a in the axial direction to bring the other sides of the load rollers 4a into contact with the side walls 12 formed on the sliding bed 1. As a result, fricitonal forces are established between the sides of the load rollers 4a and the pressure surfaces 52 and the side walls 12 to increase the rolling resistances of the load rollers 4a so that high sliding resistances are exerted upon the sliding bed 1 sliding on the tack base 2 (as seen from FIG. 12).

Thus, in the linear sliding bearing of the present embodiment, the sliding resistance of the sliding bed 1 can be increased by applying the pressure to the oil pocket 51 of the braking plate 5, thereby to strengthen the axial rigidity of the track base 2 of the linear sliding bearing.

In the linear sliding bearing of the present embodiment, moreover, the oil pressure to be applied to the oil pocket 51 can be suitably adjusted to establish the axial rigidity of the track base 2, if necessary, and to adjust it to an arbitrary level.

Second Embodiment

Figure 13:
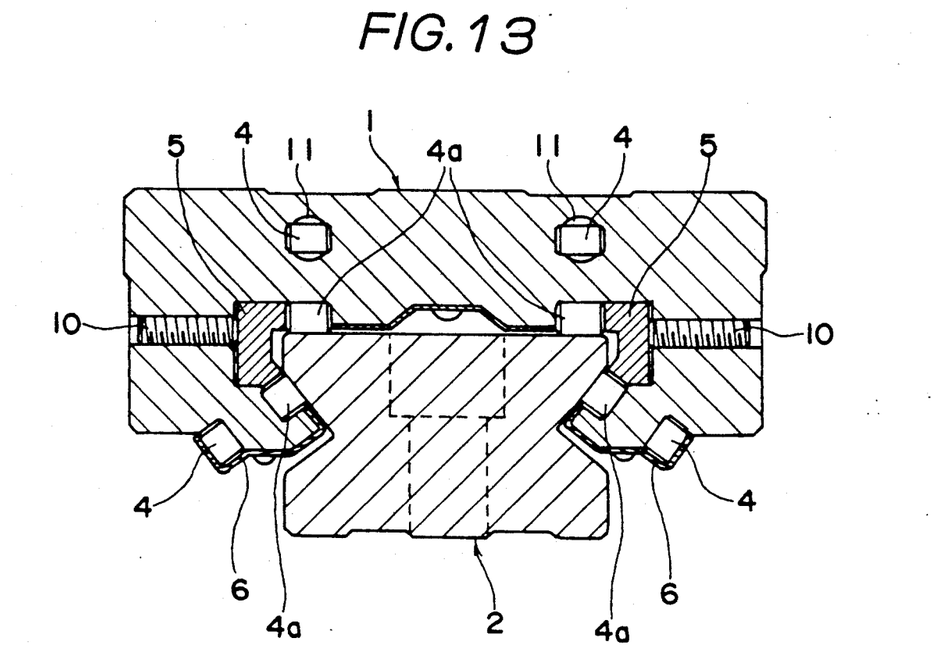
FIG. 13 is a sectional front elevation showing a second embodiment of the linear sliding bearing of the present invention.

A linear sliding bearing according to the present embodiment is substantially identical to that of the first embodiment except in that two braking plate 5 are disposed at the inner sides of the righthand and lefthand skirts 1b of the sliding bed 1 to push the sides of two rows of load rollers 4a rolling on the upper and lower races of the track base 2, as shown in FIG. 13.

The sliding bed 1 is formed between the load regions of the upper endless roller track and the lower endless roller track with grooves for housing the braking plates 5 and at its righthand and lefthand skirts 1b with bolt mounting through holes in which are fastened pressure bolts 10 for pressing the braking plates 5.

Thus, the braking plates are housed in the grooves, and the pressure bolts 10 fitted in their mounting holes are driven forward internally of the skirts. Then, the fastening forces of the pressure bolts 10 are exerted as the pressures upon the braking plates 5 so that the braking plates 5 push the sides of the load rollers 4a rolling in the load regions. As a result, the sliding resistance of the sliding bed 1 is increased as in the first embodiment.

Thus, in the linear sliding bearing of the present embodiment, the axial rigidity of the track base 2 can be strengthened by adjusting the turns of the pressure bolts 10.

Third Embodiment

Figure 14:
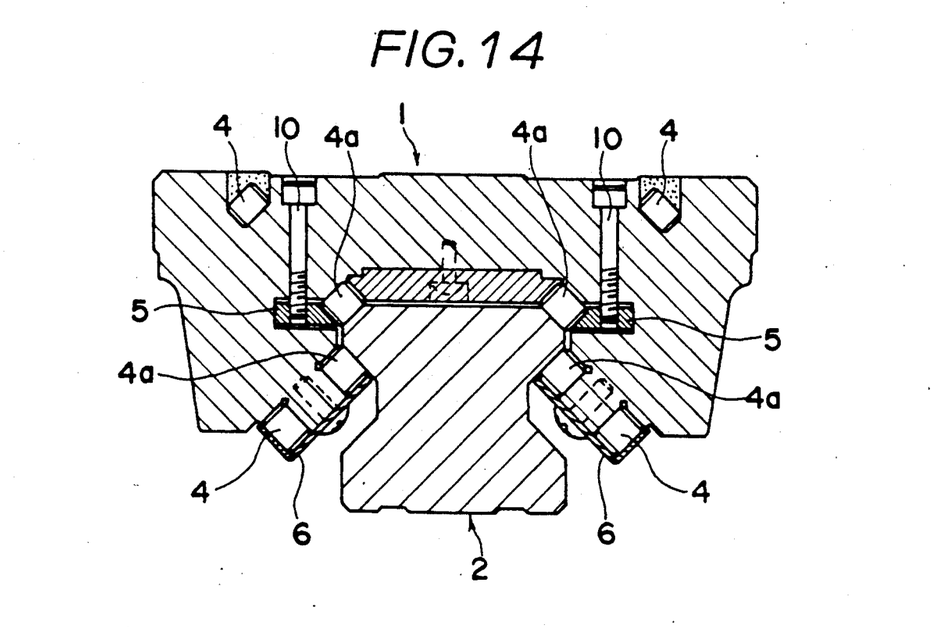
FIG. 14 is a sectional front elevation showing a third embodiment of the linear sliding bearing of the present invention.

A linear sliding bearing according to the present embodiment is substantially identical to that of the first embodiment except in that adjust bolts 10 are extended through the sliding base 1 from the to horizontal surface to engage with the braking plates 5 positioned at the inner sides of the righthand and lefthand skirts of the sliding bed 1 so that they may be fastened to raise the braking plates 5 to push the sides of the load rollers 4a rolling on the upper races of the track base 2, as shown in FIG. 14. The axial rigidity of the track base 2 can also be strengthened according to the present embodiment.

Fourth Embodiment

Figure 15:
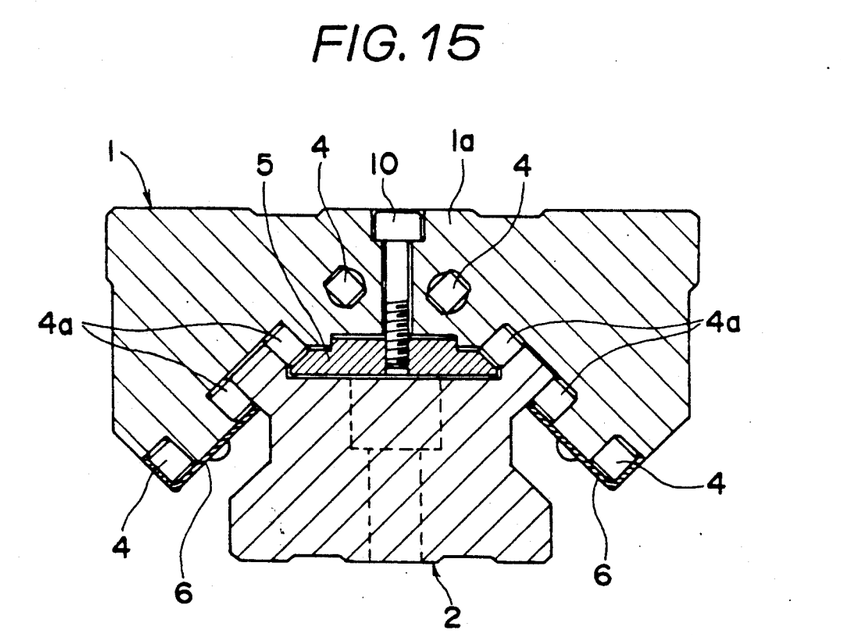
FIG. 15 is a sectional front elevation showing a fourth embodiment of the linear sliding bearing of the present invention.

A linear sliding bearing according to the present embodiment is a modification of the third embodiment and is substantially identical to that of the third embodiment except in that the angle of inclination of the load races of the upper endless roller tracks whereas the braking plate 5 is arranged at the lower side of the horizontal portion 1a of the sliding bed 1, as shown in FIG. 15, so that the sides of the righthand and lefthand upper load rollers 4a may be pushed by the single adjust bolt 10.

Fifth Embodiment

Figure 16:
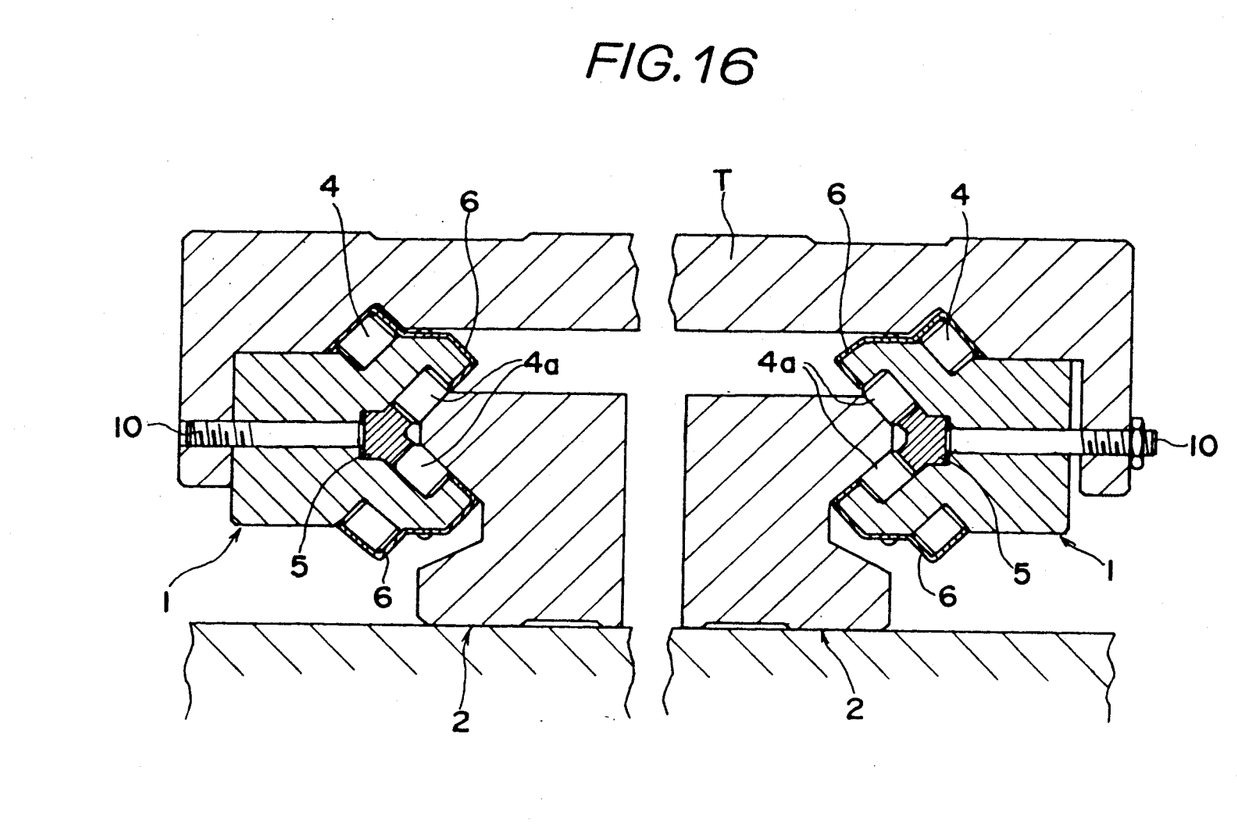
FIG. 16 is a sectional front elevation showing an embodiment of the linear sliding table according to the present invention.

FIG. 16 shows an embodiment of the linear sliding table according to the present invention. A pair of righthand and lefthand track bases 2 are arranged in parallel at a suitable spacing, and a pair of righthand and lefthand sliding beds 1 having braking plates 5 are slid along the external sides of the track bases 2. A table T is mounted to ride over the paired sliding beds 1 so that it may linearly guide a machine apparatus carried thereon.

According to the linear sliding table of the present embodiment, like the linear sliding bearings of the foregoing embodiments, the sliding resistance can be increased, while the sliding beds 1 are sliding on the track bases 2, to strengthen the rigidity of the linear sliding table in the axial direction of the track bases.

Industrial Applicability

As has been described hereinbefore, according to the linear sliding bearing of the present invention, the sliding resistance of the sliding bed siding on the track base can be adjusted to apply or adjust the rigidity in the axial direction of the track base, if necessary.

By applying a strong pressure to the load rollers by the pressure means to prevent the load rollers from rolling, moreover, the sliding bed can be continuously fixed in one portion on the tack base so that the pressure means can function as the locking mechanism of the linear sliding bearing.

According to the linear sliding table of the present invention, still moreover, like the aforementioned linear sliding bearing, the rigidity in the axial direction of the track bases can be applied to the table or adjusted so that a workpiece can be machined highly precisely in case the machine apparatus such as a machine tool is placed on the table.

I claim:

1. A linear sliding bearing comprising: a track base having axial roller races and fixed to a machine apparatus; a sliding bed formed with endless tracks, which have load regions having load races facing said roller races and no-load regions for effecting the communicating connections between the two ends of said load regions, and made movable along said track base; and a multiplicity of rollers circulating in said endless tracks for bearing the load between the load races of said sliding bed and the races of said track base, wherein the improvement resides in that said sliding bed includes: side walls extending along one-end sides of said load races for regulating the axial movements of load rollers rolling on said load races; and pressure means for pressing the one-end sides of said load rollers in the axial direction and the other sides onto said side walls.

2. A linear sliding bearing as set forth in claim 1, wherein said sliding bed includes a horizontal portion and a pair of skirts depending from the two dies of said horizontal portion to form a recess in its lower side, said skirts being formed with a pair of righthand and lefthand upper load races and lower load races extending axially on their inner sides, and wherein said pressure means arranged at the lower side of said horizontal portion for pressing the load rollers rolling on said righthand and lefthand load races.

3. A linear sliding bearing as set forth in claim 1, wherein said sliding bed includes a horizontal portion and a pair of skirts depending from the two dies of said horizontal portion to form a recess in its lower side, said skirts being formed with a pair of righthand and lefthand upper load races and lower load races extending axially on their inner sides, and wherein said pressure means arranged at the inner side of said skirt portion for pressing at least either those of the load rollers, which roll on said upper load races and said lower load races.

4. A linear sliding bearing as set forth in claim 1, wherein said sliding bed is formed into a generally rectangular shape and longitudinally along its one side with a pair of upper and lower load races, and wherein said pressure means arranged between said upper load races and said lower load races for pressing at least either those of the load rollers, which roll on said upper load races and said lower load races.

5. A linear sliding bearing as set forth in any one of claims 1 to 4, wherein said pressure means is formed, at the leading end of a pressure surface for pressing the sides of said load rollers, with a retaining surface for preventing said load rollers under a non-pressure condition from coming out.

6. A linear sliding table placed on the upper surface of a sliding bed of a bearing which comprises: a track base having axial roller races and fixed to a machine apparatus or the like; a sliding bed formed with endless tracks, which have load regions having load races facing said roller races and no-load regions for effecting the communicating connections between the two ends of said load regions, and made movable along said track base; and a multiplicity of rollers circulating in said endless tracks for bearing the load between the load races of said sliding bed and the races of said track base, said sliding bed including: side walls extending along one-end sides of said load races for regulating the axial movements of load rollers rolling on said load races; and pressure means for pressing the one-end sides of said load rollers in the axial direction and the other sides onto said side walls.

* * * * *